July 20, 1954
M. J. MEEK
2,684,318
METHOD FOR FABRICATING GLASS ROD
Filed April 3, 1950
2 Sheets-Sheet 1
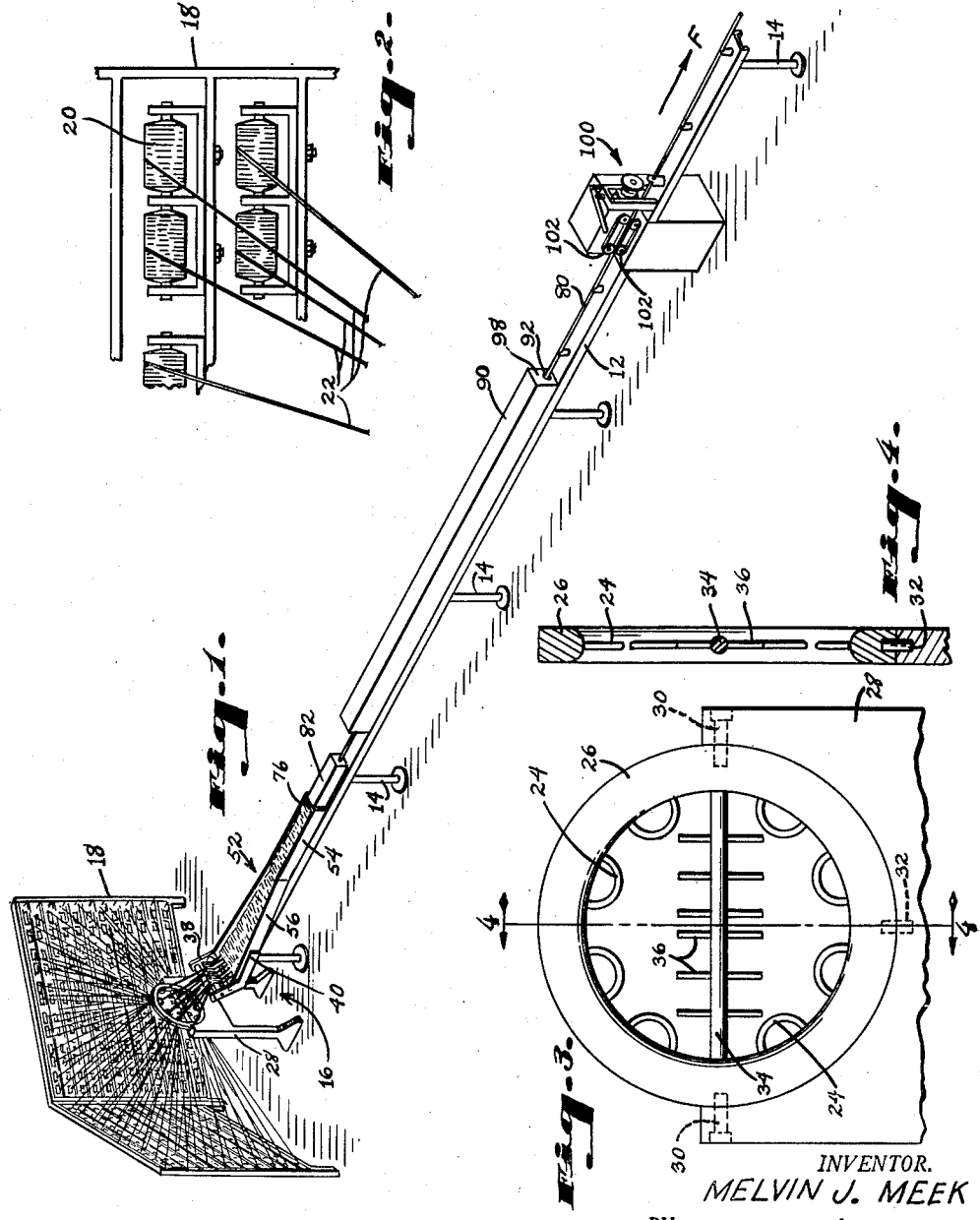
INVENTOR.
MELVIN J. MEEK
BY

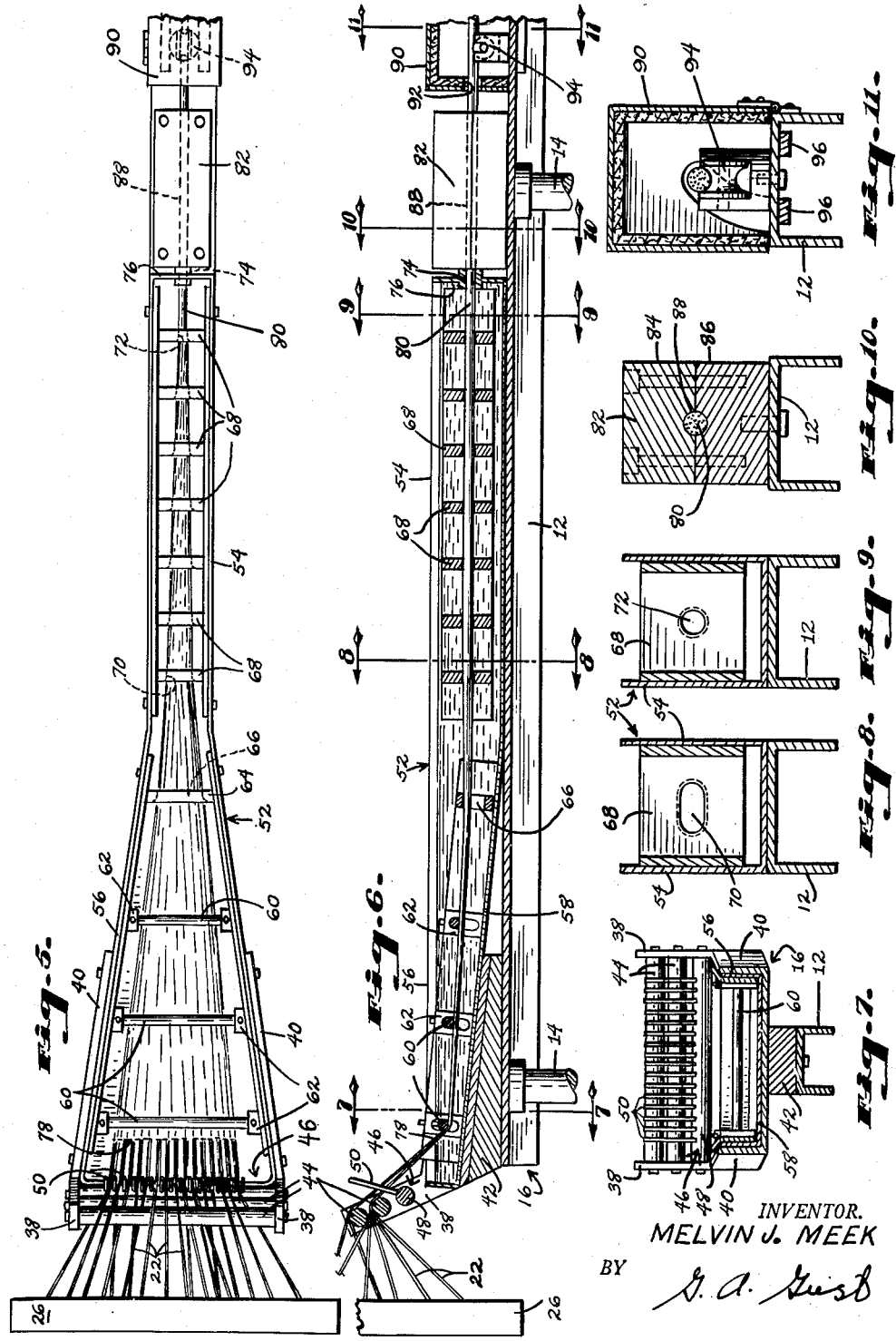

Patented July 20, 1954

2,684,318

UNITED STATES PATENT OFFICE 2,684,318

METHOD FOR FABRICATING GLASS RODS

Melvin J. Meek, Edwardsburg, Mich., assignor of one-third to Sam M. Shobert, Mishawaka, and one-third to Bernhard C. Hagquist, South Bend, Ind.

Application April 3, 1950, Serial No. 153,562

9 Claims. (Cl. 154—91)

The present invention relates to a method and an apparatus for fabricating a continuous length of resilient glass rod.

A principal object of the present invention is to provide a method of fabricating a continuous length of resilient glass rod having any desired cross-sectional size and shape and which may be cut into desired lengths.

Another principal object of the present invention is to provide an apparatus for making this resilient glass rod.

Heretofore, in the fabrication of resilient glass rods or dowels for use as fishing poles, curtain rods, and other items, it has been the practice to form the desired length and shape of each individual rod by a molding process. If it were desired to make rods of different sizes, it was necessary to use different sized molds. Needless to say, this process was time consuming, relatively complex, expensive, and required a relatively large amount of equipment. In overcoming this deficiency, it is an object of the present invention to simplify and substantially reduce the cost of making glass rod.

Another object of this invention is to provide an apparatus which will continuously operate to gather a plurality of traveling, ordinary glass threads together into a secure bundle having the desired cross-sectional shape and size, keeping, at all times, these threads in tension. It is believed that one of the principal reasons for the success of the present invention is that a means has been provided for tensioning these glass threads during the endless process which includes bonding these threads securely together.

Other objects and objects ancillary thereto will become obvious as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings,

Figure 1 is a perspective illustration of an embodiment of an apparatus of the present invention;

Figure 2 is an enlarged fragmental portion of Figure 1 showing one method of supporting a plurality of spools of glass thread for rotation;

Figure 3 is a front elevation of an annular structure for gathering the glass threads forwarded from the plurality of spools;

Figure 4 is an axial section taken on section line 4—4 of Figure 3;

Figure 5 is a partial top plan view of the embodiment of Figure 1;

Figure 6 is a longitudinal section of the structure of Figure 5;

Figure 7 is a transverse section taken substantially on section line 7—7 of Figure 6;

Figure 8 is a transverse section taken substantially on section line 8—8 of Fig. 6.

Figure 9 is a transverse section taken substantially on section line 9—9 of Figure 6;

Figure 10 is a transverse section taken substantially on section line 10—10 of Figure 6; and Figure 11 is a transverse section taken substantially on section line 11—11 of Figure 6.

Referring to the drawings, and more particularly to Figure 1, the apparatus comprises a relatively long, horizontal frame member 12 of channel shaped cross section, preferably made of iron, supported in its illustrated elevated position by means of a plurality of spaced support pedestals 14. At the left or head end 16 of frame member 12 is mounted a creel or frame 18 for rotatably supporting a plurality of horizontally and vertically spaced spools 20 of glass thread. These threads, generally indicated by reference numeral 22, are passed through eyelets 24 suitably secured to and spaced about the inner periphery of a gathering annulus 26 which is rigidly supported in spaced relation from frame end 16 by means of a frame 28. A pair of diametrically disposed fastening pins or bolts 30, in conjunction with a like pin or bolt 32 may be used to secure the gathering annulus 26 in place on frame 28. Coincident with the horizontal diameter of annulus 26 and suitably secured thereto is a bar 34 having a plurality of spaced, rigid, substantially vertical, radial fingers 36 which receive therebetween on either side of bar 34, some of the threads 22 forwarded from creel 18. The threads 22 are passed through respective eyelets 24 and between respective bars 36 in such relation as will produce the desired result. This relation, while not critical, will become apparent as the description proceeds.

Rigidly secured to the end 16 of frame 12 is a pair of upstanding supports 38 which have a pair of horizontally projecting arms 40, respectively, adapted to be secured to respective sides of either the frame 12 itself or to a wedge shaped block 42 securely positioned on top of frame 12. The purpose of this block 42 will be explained hereafter. Horizontally journalled between said supports 38 are a pair of vertically spaced guide rollers 44 which receive over, under, and therebetween, in a predetermined manner, the threads 22. Rigidly mounted immediately below the lower roller 44 is a comb structure 46 which is constituted by a bar 48 fastened at its ends to respective upstanding supports 38, and a plurality of radially outwardly projecting teeth or fingers 50 which are secured to and axially spaced along said bar 48.

Positioned on the top side of frame 12 adjacent the comb structure 46 is a vat or container 52 having a narrow portion 54 on one end and a flared portion 56 on the other end. As viewed in Figure 6, it is to be noted that the bottom 58 is inclined slightly upwardly and rests on block 42 for support. Rotatably supported in parallel spaced relation between the sides of flared portion 56 are three guide rods 60 whose ends are preferably mounted in respective slotted blocks 62 for vertical adjustment, said blocks 62 being suitably secured to the respective sides of flared portion 56. A rectangular bar 64 is also secured between the sides of flared portion 56 and is provided with an elongated aperture 66. As viewed in Figures 5 and 6, threads 22 engage the undersides of rods 60, and pass through aperture 66, whereby the threads 22 are gathered inwardly for subsequent feeding through a series of gathering and sizing dies 68. As illustrated, seven such dies are used; however, it is to be understood that any number may be used without departing from the scope of this invention. Referring to Figures 8 and 9, it is seen that the left hand die 68 has an elongated opening 70 while the right hand die 68 has a round opening 72. The openings in all seven of the dies are progressively varied in size to collect and shape in an orderly manner all of the threads 22 into the desired cross-sectional shape and size. These die 68 openings may have other shapes and sizes depending upon the desired shape and size of the finished product. The threads 22 after leaving aperture 66 pass through these die 68 openings and thence through a suitably sized opening 74 in the end 76 of narrow container portion 54.

This invention utilizes a heat-hardenable resin which is poured, in liquid, uncured state into container 52. As viewed in Figures 5 and 6, the threads 22 enter this liquid resin ahead of the left hand guide bar 60 along a line 78 defined by the various threads' points of entry into said liquid resin. As viewed in Figure 6, the threads 22 are completely submerged in this resin bath throughout the entire length of container 52, and are progressively gathered together along the length of this container 52 as they follow a substantially collinear path until they are finally formed into a bundle 80 having substantially the desired finished cross-sectional size and shape of the finished rod.

Next the bundle 80 is fed through a final sizing die 82 which may or may not be used, depending upon individual preferences, said die 82 merely comprising a pair of complementary sections 84 and 86 suitably formed to provide a longitudinal opening 88 having a size which determines the size and shape of the finished rod. This die 82 is secured on top of frame 12 with the axis of opening 88 being collinear with the aligned axes of symmetry of the openings in dies 68.

The bundle 80 after leaving die 82 continues to follow the aforementioned substantially collinear path and enters a relatively long curing oven 90 which is completely enclosed except for the openings 92, in the two ends thereof. Grooved guiding rollers 94 are longitudinally spaced along the floor of the oven 90 and the top side of frame 12, and serve to support for longitudinal travel the bundle 80. Actually, because of the resin, the bundle after it leaves the dies 68 and 82 is self-supporting and will retain its shape as it passes through the curing oven 90. The space inside oven 90 is heated, preferably uniformly, by any suitable means, and in the present instance by electrical strip heaters 96 which run along the underside of frame 12 for the entire length of the oven 90. The heat from the heaters 96 rises and fills the oven 90. The necessary temperature and the length dimension of the oven 90 depends upon the curing characteristics of the resin used and may easily be determined either by experiment or from the resin manufacturer's specifications.

In practice, a resin is used which will cure, or polymerize at a temperature of 300 degrees F., and the length of the oven 90 is made such that the bundle 80 will be maintained substantially at this temperature for the necessary period of curing time, this length depending upon the velocity at which said bundle 80 is caused to pass through said oven 90. A thermo-responsive control may be used in said oven to keep the temperature at a constant value.

As the individual threads 22 travel submerged through the liquid and are gathered by the immersed dies 68, any air carried by the thread inherently is rubbed off or squeezed out, such air then levitating in the resin to the surface thereof. As the air leaves the threads, liquid resin flows into the void spaces thereby insuring complete impregnation. The resultant rod is then free of entrained air.

Mounted on frame 12 in spaced relation from the outlet end 98 of oven 90 (see Figure 1) is a pulling device 100 which is comprised of a pair of driven friction rollers 102 which are adapted to grip therebetween the cured bundle 80 in such a manner as to impart a constant velocity thereto in the direction of arrow F. This pulling device 100 constitutes the sole means for conveying the threads 22 through the various stages of processing, it being obvious that these threads 22 are thereby maintained in tension. The degree of tension is determined by the frictional resistance to rotation of the spools 20, and the frictional resistance between the various gathering and guiding devices and the threads 22. This tension may obviously be varied to obtain the desired resilient characteristics of the final product.

The finished rod leaves the pulling device 100 and may then be cut into desired lengths by any means well known to the art.

A glass rod produced by this method and apparatus having an approximate length of five feet and a diameter of approximately three-eighths of an inch can be pulled around into a complete circle and then released whereupon it will return to its original rod-like form.

The resin is a conventional type used in other well known processes for making resilient glass rod products.

I claim:

1. A method for producing resilient solid glass rods comprising the steps of continuously drawing a plurality of glass threads through a bath of liquid heat-hardenable resin, gathering said threads into a rod-like bundle, squeezing out air entrapped between the gathered threads, compressing said rod-like bundle into a predetermined cross-sectional shape and size, passing said bundle through an oven for curing the resin, and cutting the cured bundles into desired lengths, said threads being maintained in tension during the curing step.

2. A method for producing resilient solid glass rods comprising the steps of tensioning a plurality of glass threads, continuously drawing said threads through a bath of liquid heat-hardenable resin, gathering said threads into a rod-like bundle, withdrawing the air entrapped in the bundle, forming said rod-like bundle into a predetermined cross-sectional shape and size, and curing the resin in said bundle by means of heat.

3. A method for producing a continuous length of resilient solid glass rod from a plurality of glass threads bonded together by means of a heat-hardenable resin by continuously pulling said threads along a predetermined path, drawing said threads through a liquid heat-hardenable resin, gathering said threads into a bundle having a predetermined cross-sectional shape and size, withdrawing air entrapped in said bundle, and curing the resin impregnated bundle by means of heat.

4. A method for producing a continuous length of resilient solid glass rod from a plurality of glass threads bonded together by means of a heat-hardenable resin by pulling said threads along a predetermined path, wetting said threads as they pass a predetermined location, gathering said wetted threads into a rod-like bundle as they pass a second predetermined location, withdrawing air entrapped in said bundle and curing said resin impregnated bundle by means of heat as it passes a third predetermined location.

5. A method for producing a continuous length of resilient solid glass rod from a plurality of glass threads bonded together by means of a heat-hardenable resin by continuously pulling said threads through a quantity of liquid heat-hardenable resin, forming said resin coated threads into a rod-like bundle of a predetermined cross-sectional shape and size, and during the bundle forming step causing air entrapped in said bundle to be eliminated, and then curing said resin impregnated bundle until it is securely bonded into shape.

6. The steps in the method of making a continuous length of resilient solid glass rod which may be cut into desired lengths by successive cutting operations, comprising: continuously forwarding a plurality of glass threads under tension along a predetermined path, coating said threads with a bonding material as they traverse a first predetermined location, gathering said coated threads as they traverse a second predetermined location into a rod-like bundle having a desired cross-sectional shape and size, expelling air entrained in the bundle in a plurality of successively spaced steps, and curing the bonding material in said bundle as it traverses a third predetermined location to bond said threads together.

7. The steps in the method of making a continuous length of resilient solid glass rod which may be cut into desired lengths by succesive cutting operations, comprising: continuously pulling a plurality of glass threads, first, through a bath of liquid heat-hardenable resin, secondly, through a plurality of spaced gathering dies immersed in said bath for collecting said threads into a bundle having the desired cross-sectional size and shape, and thirdly through an oven adapted to heat the resin impregnated rod to curing temperature whereby said threads will be securely bonded together to form a solid rod.

8. The steps in the method of making a continuous length of resilient solid glass rod which may be cut into desired lengths by successive cutting operations, comprising: continuously forwarding a plurality of glass threads under tension along a predetermined substantially collinear path, a portion of said path being submerged in heat-hardenable resin, said resin covering and adhering to said threads as the latter pass therethrough, gathering said covered threads into a rod-like bundle while they are still submerged in said resin, removing any air which may be carried by said threads during submergence in said resin, said removed air levitating to the surface of said resin, and curing said resin in said bundle until it is securely bonded into shape.

9. The steps in the method of making a continuous length of resilient solid glass rod which may be cut into desired lengths by successive cutting operations, comprising: continuously forwarding a plurality of glass threads under tension along a predetermined substantially collinear path, a portion of said path being submerged in heat-hardenable resin, said resin covering and adhering to said threads as the latter pass therethrough, gathering said covered threads into a rod-like bundle while they are still submerged in said resin, removing any air which may be carried by said threads during submergence in said resin, said removed air levitating to the surface of said resin, causing said bundle to retain its shape after it has passed from said gathering without the use of any holding means externally applied to said bundle, and curing said resin in said bundle until the latter is securely bonded into shape.

References Cited in the file of this patent

UNITED STATES PATENTS

| Number | Name | Date |
|---|---|---|
| 56,393 | Ensign | July 17, 1866 |
| 787,886 | Anet | Apr. 25, 1905 |
| 1,192,017 | Subers | July 25, 1916 |
| 1,421,306 | Rawlings | June 27, 1922 |
| 1,520,342 | Grabau | Dec. 23, 1924 |
| 1,744,561 | Marckworth | Jan. 21, 1930 |
| 2,308,825 | Rawlings | Jan. 19, 1943 |
| 2,419,328 | Watson et al. | Apr. 22, 1947 |
| 2,427,507 | Powell | Sept. 16, 1947 |

FOREIGN PATENTS

| Number | Country | Date |
|---|---|---|
| 892,116 | France | Jan. 3, 1944 |
| 627,255 | Great Britain | Aug. 4, 1949 |

OTHER REFERENCES

Howald, Modern Plastics, February, 1946, pages 124 and 125.